United States Patent
Mamyshev et al.

(10) Patent No.: US 7,366,425 B2
(45) Date of Patent: Apr. 29, 2008

(54) METHODS AND APPARATUS FOR SPECTRALLY EFFICIENT OPTICAL MODULATION

(75) Inventors: Pavel V. Mamyshev, Morganville, NJ (US); Christian J. Rasmussen, Nashua, NH (US); Benny P. Mikkelsen, Boston, MA (US); Fenghai Liu, Nashua, NH (US)

(73) Assignee: Mintera Corporation, Lowell, MA (US)

( * ) Notice: Subject to any disclaimer, the term of this patent is extended or adjusted under 35 U.S.C. 154(b) by 721 days.

(21) Appl. No.: 10/386,359

(22) Filed: Mar. 11, 2003

(65) Prior Publication Data

US 2003/0175036 A1    Sep. 18, 2003

Related U.S. Application Data

(60) Provisional application No. 60/364,791, filed on Mar. 15, 2002.

(51) Int. Cl.
*H04B 10/04* (2006.01)
(52) U.S. Cl. .................................... 398/188
(58) Field of Classification Search ............... 398/188, 398/182, 183, 189
See application file for complete search history.

(56) References Cited

U.S. PATENT DOCUMENTS

2002/0196508 A1* 12/2002 Wei et al. .................. 359/183

OTHER PUBLICATIONS

Winzer et al. (P.J. Winzer and J. Leuthold, "Return-to-zero modulator using a single NRZ drive single and an optical delay interferometer", IEEE Photonics Tech Lett, vol. 13, Dec. 2001, pp. 1298-1300).*

Pennickx et al. (D. Pennickx et al. "Optical differential phase shift keying (DPSK) direct detection considered as a duobinary signal", Proc. ECOC 2001, 2001, pp. 456-457).*

Esman et al., "Wideband Efficiency Improvement of Fiber Optic Systems by Carrier Subtraction", IEEE Photonics Technology Letters, vol. 7, No. 2, Feb. 1995.

Modulations Formats Research at COM, "New Modulation Formats in Optical Communications", http://www.com.dtu.dk/research/style...search_areas/modulation_formats.html, Jan. 24, 2003.

* cited by examiner

*Primary Examiner*—Jason Chan
*Assistant Examiner*—Quan-Zhen Wang
(74) *Attorney, Agent, or Firm*—Weingarten, Schurgin, Gagnebin & Lebovici LLP

(57) ABSTRACT

Different techniques for generating spectrally efficient carrier-suppressed modulated optical signals, also known as "phase-shaped binary transmission" (PSBT) signals, employ electrical components that generate only 2-level or binary signals, in contrast to techniques that require 3-level electrical drivers. The PSBT modulators can be used with return-to-zero (RZ) modulators for generating RZ-PSBT signals, which have the characteristic of even greater spectral efficiency than NRZ PSBT signals. The technique is generalized to RZ signals with an arbitrary phase difference between pulses. These signals can be generated by shifting the central (carrier) frequency of an RZ modulated optical signal, which can be done using a certain phase modulation or using spectral filtering with a passband offset from the center (carrier) frequency of the modulated optical signal, and the signals can also be generated by phase modulation at a frequency lower than the signaling rate of the modulated signal.

4 Claims, 16 Drawing Sheets

(a)

(b)

(a)

(b)

(a)

(b)

(a)

(b)

(a)

(b)

METHODS AND APPARATUS FOR SPECTRALLY EFFICIENT OPTICAL MODULATION

CROSS REFERENCE TO RELATED APPLICATIONS

This application claims priority under 35 U.S.C. §119(e) of U.S. Provisional Patent Application No. 60/364,791 filed Mar. 15, 2002.

STATEMENT REGARDING FEDERALLY SPONSORED RESEARCH OR DEVELOPMENT

Not Applicable

BACKGROUND OF THE INVENTION

The present invention is related to the field of optical communications, and more particularly to optical modulation in optical communications systems.

The ever-growing demand for bandwidth of optical transmission systems requires an efficient utilization of available optical spectral bandwidth of the systems. Spectral efficiency can be expressed as the ratio of the bit-rate of an optical channel divided by the frequency spacing between channels in a wavelength-division-multiplexed (WDM) system. As an example of such a measure, current commercial systems exhibit a per-channel bit-rate of 10 Gb/s and channel spacing of 50 GHz, which provides a spectral efficiency of 0.2 bits/s/Hz.

Traditionally, optical communications have employed so-called "non-return-to-zero" or NRZ amplitude modulation of an optical carrier signal. In NRZ modulation, the optical carrier is either "on" or "off" for the duration of each signaling interval of the modulating data signal. While NRZ modulation in optical communications systems has the advantage of simplicity, it is known to suffer from relatively poor spectral efficiency.

It is known that more advanced modulation formats such as duo-binary formats (also referred to as "phase-shaped binary transmission" or PSBT), band-limited return-to-zero (RZ) format, and vestigial-side-band (VSB) format offer better spectral efficiency than traditional NRZ modulation. The spectral efficiencies of these formats can be as high as 0.8 bits/s/Hz without the use of polarization multiplexing.

Another class of more advanced modulation formats is known as "carrier-suppressed return-to-zero" (CS-RZ) modulation. CS-RZ modulated signals have the unique feature that adjacent pulses have a phase difference of $\pi$, which results in a suppressed spectral component at the central (carrier) frequency of the modulated optical signal. The use of such signals for high quality pulse train generation and for soliton compression has been proposed. It has also been discovered that CS signals generally are very robust with respect to nonlinear effects in optical fibers. Therefore, the use of the CS format for optical data transmission has also been suggested.

BRIEF SUMMARY OF THE INVENTION

In accordance with the present invention, methods and apparatus for spectrally efficient modulation are disclosed.

In particular, methods and apparatus for generating phase-shaped binary transmission (PSBT) modulated optical signals are shown. The disclosed techniques have the advantage of employing electrical components that generate only 2-level (binary) signals, in contrast to existing techniques that rely on 3-level (ternary) electrical drivers. Additionally, methods and apparatus are shown for generating return-to-zero (RZ) PSBT signals, which have the characteristic of even greater spectral efficiency than NRZ PSBT signals.

Methods and apparatus are also shown for generating carrier-suppressed return-to-zero (CS-RZ) signals, and more generally, RZ signals exhibiting an arbitrary phase difference between adjacent pulses. One class of these techniques involves shifting the central (carrier) frequency of an RZ modulated optical signal, which results in suppressing the carrier. This frequency-shifted approach can be realized using certain forms of phase modulation and using spectral filtering with a passband that is offset from the center (carrier) frequency of the RZ modulated optical signal. A second class of techniques for generating CS-RZ signals involves non-frequency-shifting phase modulation at a frequency lower than the signaling rate of the modulated signal.

Other aspects, features, and advantages of the present invention will be apparent from the Detailed Description that follows.

BRIEF DESCRIPTION OF THE SEVERAL VIEWS OF THE DRAWING

The invention will be more fully understood by reference to the following Detailed Description of the Invention in conjunction with the Drawing, of which.

DETAILED DESCRIPTION OF THE INVENTION

The disclosure of U.S. Provisional Patent Application No. 60/364,791 filed Mar. 15, 2002 is hereby incorporated by reference.

Figure 1:
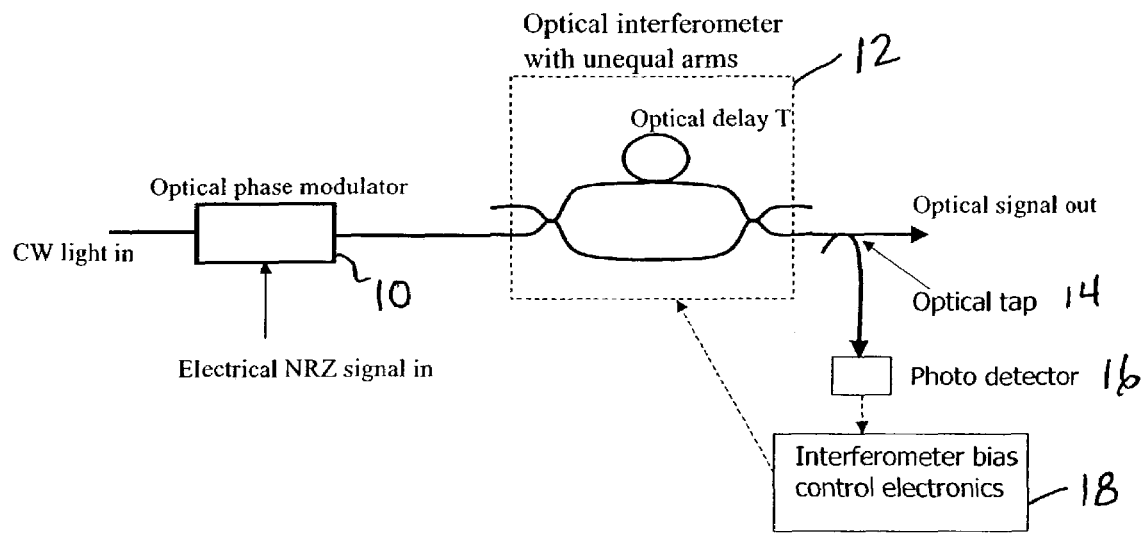
FIGS. 1-3 are block diagrams of first, second and third optical transmitters for generating phase-shaped binary transmission (PSBT) modulated optical signals in accordance with one aspect of the present invention.
Figure 2:
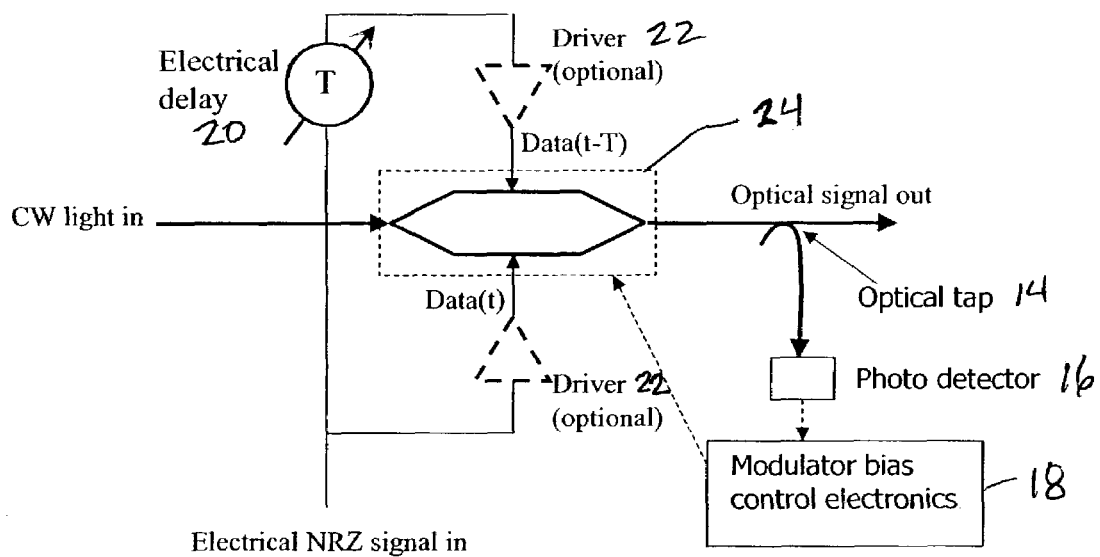
Figure 3:
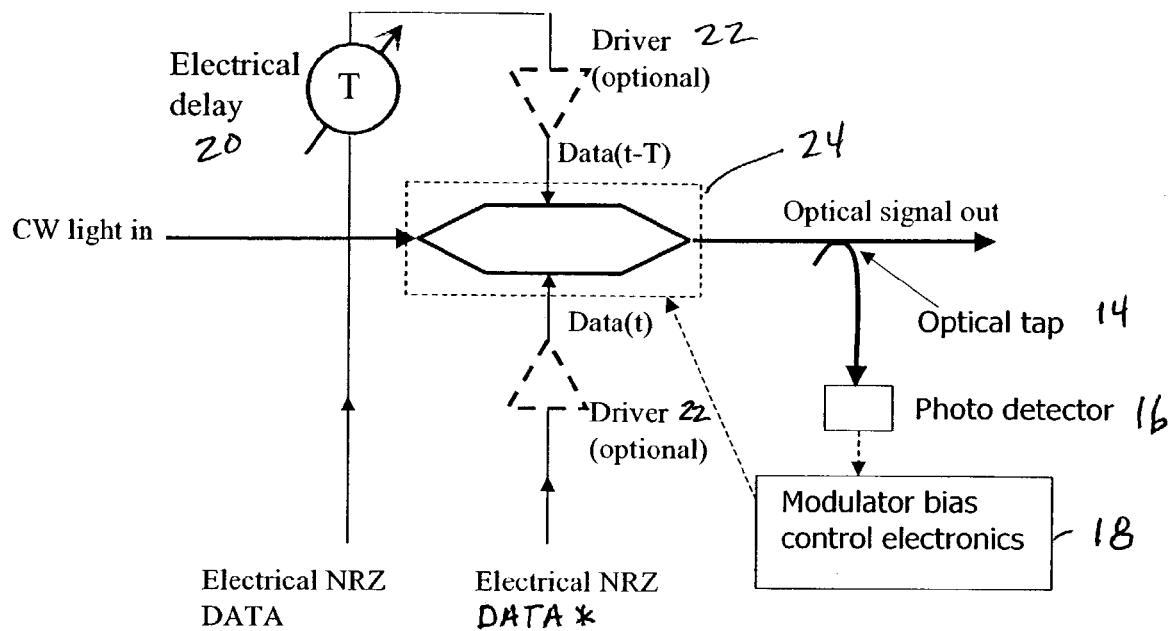

FIGS. 1-3 show different methods for generating PSBT modulated optical signals.

In the first method, shown in FIG. 1, an electrical NRZ binary data signal is applied to an optical phase modulator 10. A continuous-wave (CW) optical signal from a laser (not shown) is modulated by the NRZ data signal in the phase modulator 10, and the phase-modulated signal is provided to a Mach-Zehnder interferometer 12. The optical length of one arm of the interferometer is longer than the length of the other arm by (approximately) one bit period T (T=1/B, where B is the bit-rate of the signal). A portion of the output optical signal is tapped by an optical tap 14. This portion is converted to an electrical signal by a photodetector 16, and the electrical signal is used by bias control electronics 18 to generate bias for the interferometer 12. With appropriate biasing of the interferometer 12 (described below), the optical signal generated at the output of the interferometer has a phase-shaped binary transmission (PSBT) format. Note that either output of the interferometer 12 can be used.

In the second method, shown in FIG. 2, an electrical NRZ binary data signal is split into two. The respective delays along the paths of the two electrical signals differ from each other by approximately one bit period T. This can be accomplished, for example, by an electrical delay element 20. The two signals may be amplified by optional driver amplifiers 22. The two electrical signals are applied to the two arms of a Mach-Zehnder optical modulator 24. With appropriate biasing of the modulator, a PSBT optical signal is generated at the output of the modulator 24.

A third method, shown in FIG. 3, is similar to the method shown in FIG. 2, except that instead of splitting the electrical NRZ binary data signal, true and complement versions (DATA and DATA*) of the NRZ electrical signal are used.

It is noted that in the embodiments of FIGS. 1-3, the photo detector 16 of the bias control electronics 18 should measure the optical power of the signal around the center optical frequency (or wavelength) of the modulated optical signal while minimizing any response to other spectral components. To do that, a band-bass optical filter (not shown) centered at the signal central frequency should be inserted. In the embodiment of FIG. 1, this filter can be inserted either (a) between the phase modulator 10 and the interferometer 12, (b) between the interferometer 10 and the optical tap 14, or (c) between the optical tap 14 and the photo detector 16. In the embodiments of FIGS. 2 and 3, this filter can be inserted (a) between the modulator 24 and the optical tap 14, or (b) between the optical tap 14 and the photo detector 16.

Figure 4:
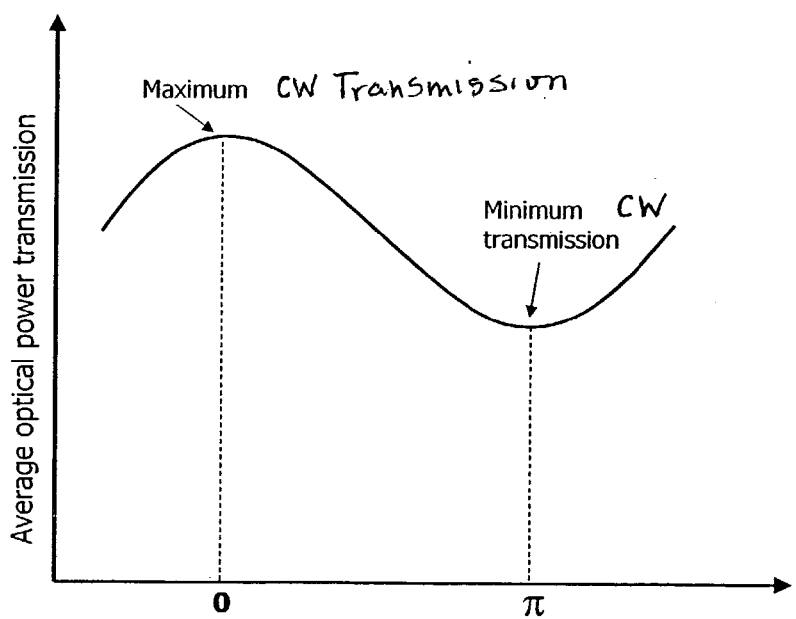
FIG. 4 is a plot of the transmission characteristics of an optical modulator as a function of bias voltage as known in the art.
Figure 5:
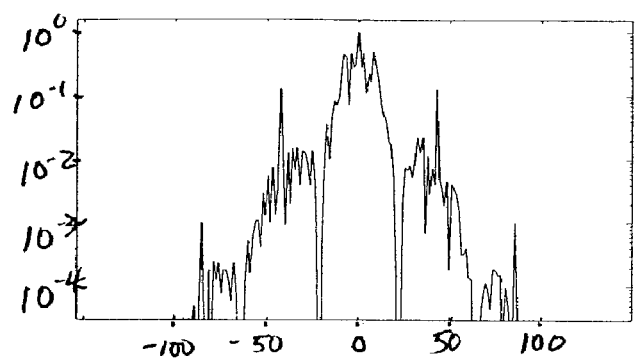
FIGS. 5(a) and 5(b) are plots of signal spectrum and time-domain eye opening, respectively, of a first PSBT modulated optical signal that can be generated by any of the transmitters of FIGS. 1-3.
Figure 5:
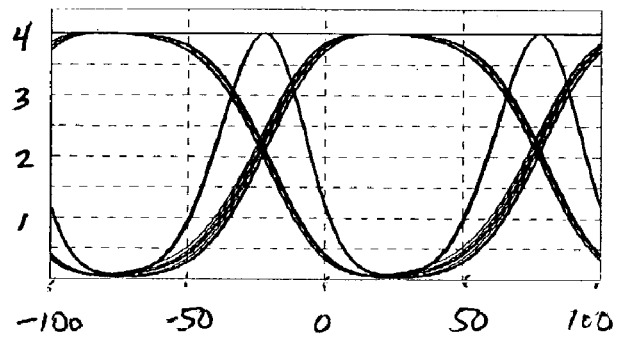
Figure 6:
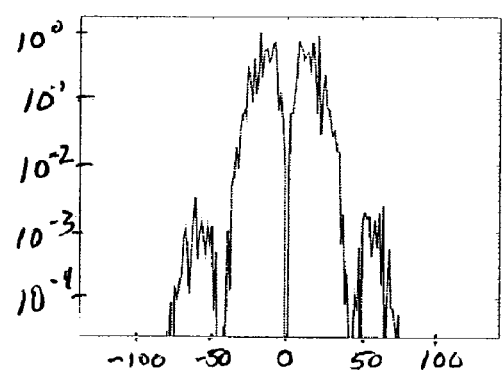
FIGS. 6(a) and 6(b) are plots of signal spectrum and time-domain eye opening, respectively, of a second PSBT modulated optical signal that can be generated by any of the transmitters of FIGS. 1-3.
Figure 6:
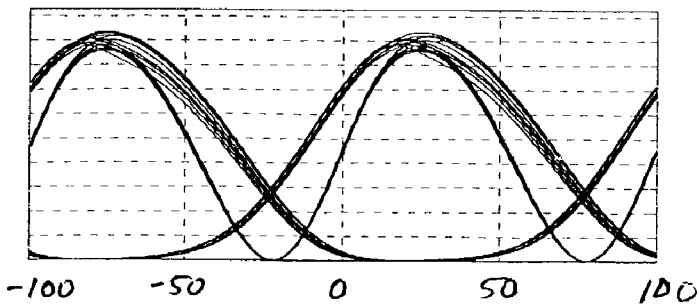

As shown on the transfer characteristics plotted in FIG. 4, the interferometer 12 and Mach-Zehnder modulator 24 have points of relative maximum transmission and relative minimum transmission of an input CW optical signal, which are shown as occurring at corresponding bias points of 0 or π. When the interferometer 12 or modulator 24 is biased for maximum CW transmission in one of the transmitters of FIGS. 1-3, the optical spectrum of the output duo-binary optical signal has a maximum at the carrier frequency (i.e., at the frequency of the unmodulated CW signal from the laser). This spectrum is shown in FIG. 5(a). FIG. 5(b) shows the corresponding eye diagram. As shown in FIG. 6(a), the optical spectrum of the output duo-binary optical signal has a minimum at the carrier frequency (i.e. the carrier frequency is suppressed) when the modulator 24 or interferometer 12 is biased for minimum CW transmission. FIG. 6(b) shows the corresponding eye diagram. For purposes of reference below, the modulated signal of FIGS. 5(a) and 5(b) is referred to as the "D1" signal, and the modulated signal of FIGS. 6(a) and 6(b) is referred to as the "D2" signal.

Note that for the generation of high-quality D1 signals, the amplitude of the phase modulation produced by the phase modulator 10 (FIG. 1) and by each branch of the Mach-Zehnder modulator 24 (FIGS. 2, 3) should be π. On the other hand, for the generation of high-quality D2 signals, it is not critical that the amplitude of the phase modulation produced by the phase modulator 10 and by each branch of the Mach-Zehnder modulator 24 be exactly π; it can be less (or more) than π.

Figure 7:
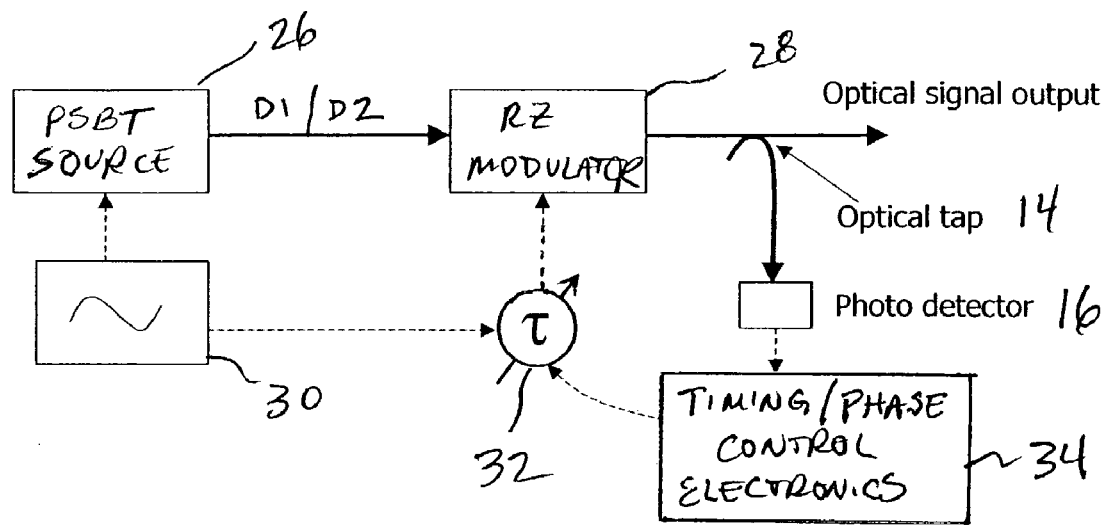
FIG. 7 is a block diagram of an optical transmitter generating an alternating-phase return-to-zero (AP-RZ) modulated optical signal in accordance with another aspect of the present invention.

While the D1 and D2 signals can themselves be used for optical transmission, it is also possible to convert these signals into different forms of return-to-zero (RZ) intensity formats that may be used in alternative optical transmission schemes. One such approach is illustrated in FIG. 7. A PSBT source 26 generates a data-modulated optical signal such as a D1 or D2 signal which is provided to an optical RZ modulator 28. The clock signal is also provided to the RZ modulator 28 via a variable delay element 32, which is under the control of timing/phase control electronics 34.

Figure 8:
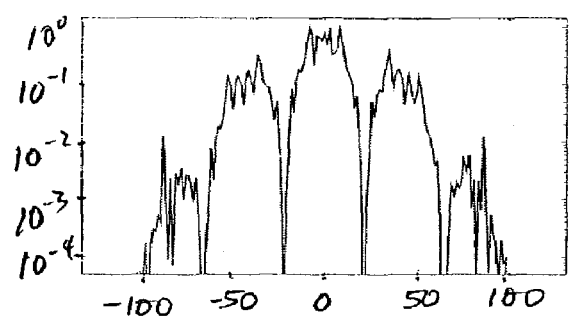
FIGS. 8(a) and 8(b) are plots of signal spectrum and time-domain eye opening, respectively, of a first return-to-zero modulated optical signal generated by the transmitter of FIG. 7.
Figure 8:
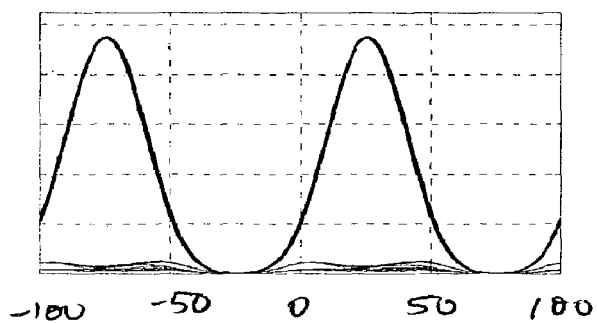
Figure 9:
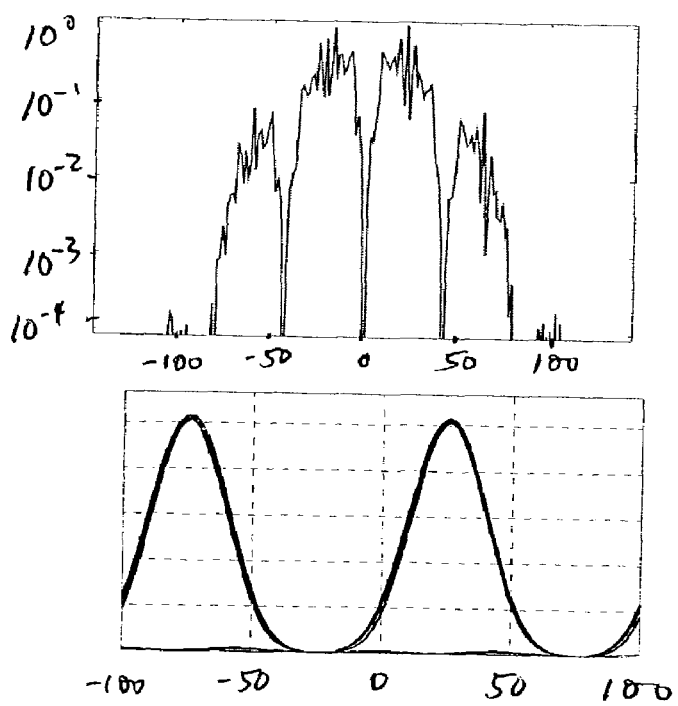
FIGS. 9(a) and 9(b) are plots of signal spectrum and time-domain eye opening, respectively, of a second return-to-zero modulated optical signal generated by the transmitter of FIG. 7.

If the RZ modulator 28 adds no phase modulation to the input optical signal from the PSBT source 26, the spectrum of the output optical signal still has a maximum or minimum at the carrier frequency as determined by the signal from the PSBT source 26. That is, if the PSBT source 28 generates a D1 signal, then the output optical signal after the RZ modulation still has a maximum at the carrier frequency (see FIG. 8(a)). Similarly, if the PSBT source 28 generates a D2 signal, the output optical signal has a minimum at the carrier frequency after the RZ modulation (see FIG. 9(a)). For purposes of reference, these two output signals are referred to below as duo-binary-1 RZ (D1RZ) and duo-binary-2 RZ (D2RZ) signals.

In an alternative approach, the RZ modulator 28 of FIG. 7 applies an "alternating phase" RZ modulation. That is, the respective optical phases of adjacent pulses created by the RZ modulator 28 differ by a predetermined amount. In one special case, pulse phases are separated by $\pi$. This special case is referred to herein as "AP($\pi$)-RZ". Other versions of alternating phase RZ modulation may generate adjacent pulses with different phase relationships, such as separation by more or less than $\pi$.

When AP($\pi$)-RZ modulation is applied to a traditional NRZ modulated optical signal, the spectrum of the resulting optical signal has a minimum at the carrier frequency, and therefore this type of RZ modulation is often referred to as "carrier-suppressed RZ" (CS-RZ) modulation. As described below, however, this type of modulation can also yield an optical signal having a maximum at the carrier frequency for certain types of input optical signals.

Figure 10:
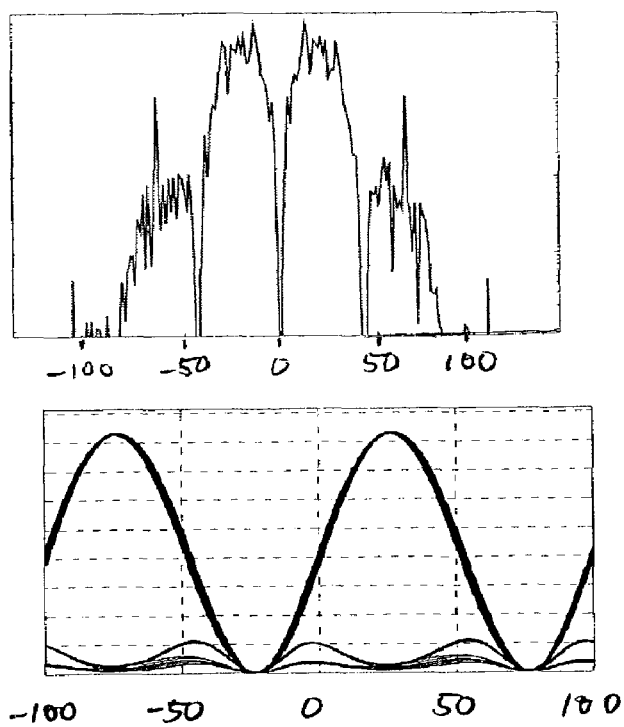
FIGS. 10(a) and 10(b) are plots of signal spectrum and time-domain eye opening, respectively, of a first AP-RZ modulated optical signal generated by the transmitter of FIG. 7.
Figure 11:
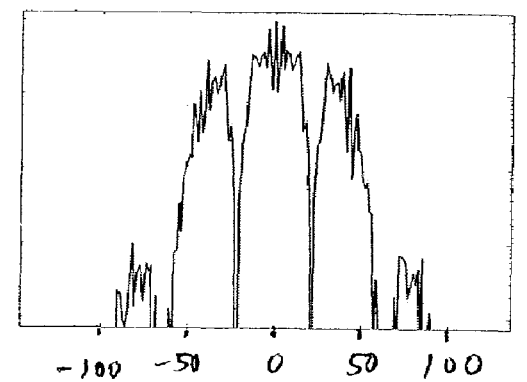
FIGS. 11(a) and 11(b) are plots of signal spectrum and time-domain eye opening, respectively, of a second AP-RZ modulated optical signal generated by the transmitter of FIG. 7.

With respect to the above-described D1 and D2 signals, after AP($\pi$)-RZ modulation is applied to the D1 signal, the output spectrum becomes carrier-suppressed. This is shown in FIG. 10(a). On the other hand, after the application of AP($\pi$)-RZ modulation to the D2 signal, the spectrum becomes "carrier expressed", i.e., the minimum at the carrier frequency of the D2 signal is converted into a maximum in the output optical signal. This is shown in FIG. 11(a). These modulated signals are referred to below as D1APRZ and D2APRZ.

Figure 12:
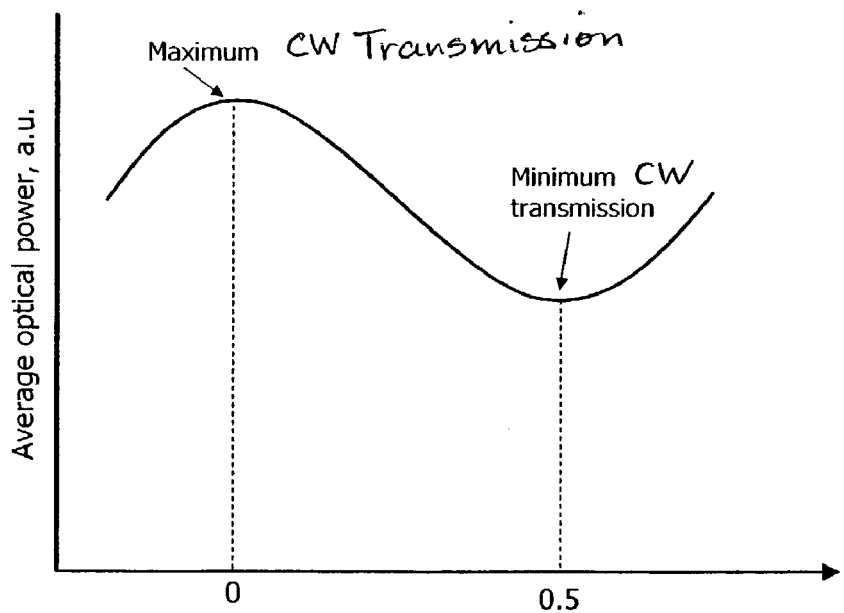
FIG. 12 is a plot of the transmission characteristics of an optical modulator as a function of the timing relationship between data and pulse components of an RZ modulated optical signal.

When duo-binary signals are converted to RZ forms, it is important to maintain the correct timing relationship between the data and the RZ pulse modulation. This can be done in the following manner. The average optical power at the output of the RZ modulator 28 is used as a feedback signal for the timing/phase control loop (see FIG. 7). For D1 signals, the timing/phase control electronics 34 adjusts the delay element 32 to achieve the maximum output average optical power. This is illustrated in FIG. 12 at an operating point labeled "0". On the other hand, for D2 signals, the control loop adjusts the delay element 32 to achieve the minimum output average optical power, which is shown in FIG. 12 at operating point "0.5".

Figure 13:
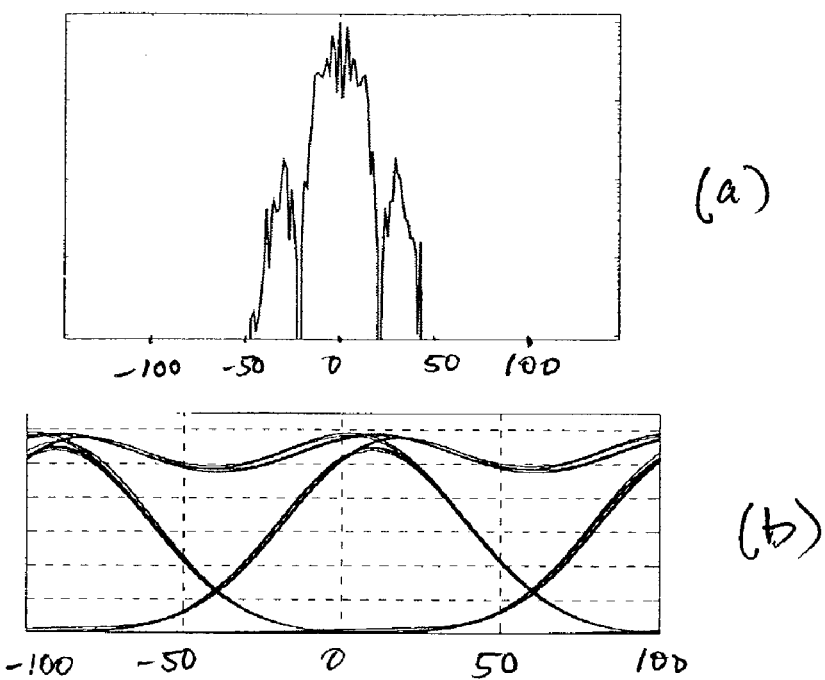
FIGS. 13(a) and 13(b) are plots of signal spectrum and time-domain eye opening, respectively, of a first modulated optical signal resulting from narrowband filtering of an AP-RZ modulated optical signal generated by the transmitter of FIG. 7.

RZ duo-binary optical signals as described above have good transmission characteristics. Additionally, D1RZ and D2APRZ are very tolerant to optical filtering. As an example, FIG. 13 shows the spectrum and the eye diagram of a 43 Gb/s D2APRZ signal after passing through an optical band-pass filter with 3dB bandwidth of only 30 GHz. It is noted that the eye is still well opened, showing the ability of this modulation format to be used in spectrally efficient systems. It is believed that this tolerance to tight spectral filtering can be explained as follows. When an optical signal passes through a band-pass filter, the signal spectrum narrows, which results in a temporal broadening of the bits of the signal. As a result, the energy from "ones" can penetrate to adjacent "zero" bit slots, leading to closing of the signal eye and to degradation of the signal quality. It appears that the worst place in a data signal pattern for such a degradation is "..101..", i.e. when a "zero" is surrounded by "ones" on both sides. This effect can be reduced if the "one" bits which surround the "zero" bit have opposite optical phases, i.e. if their optical phase difference is around $\pi$, which is a feature of D2APRZ signals. In this case, the optical fields which penetrate the "zero" slot from the adjacent "one" slots in the filtered signal tend to cancel each other due to destructive interference. This canceling effect results in a high quality signal even after tight optical filtering, as shown in FIG. 13.

Note that in transmission systems which use PSBT signals, the data signal must be logically pre-coded before transmission or logically de-coded after transmission. Described herein are methods for generation of spectrally efficient modulation formats that do not require logical coding of the signals. These new modulation formats have the above-described feature that spectrally efficient PSBT optical signals have: optical phases of "one" bits that surround a "zero" bit in a "..101.." sequence have opposite phases.

Figure 14:
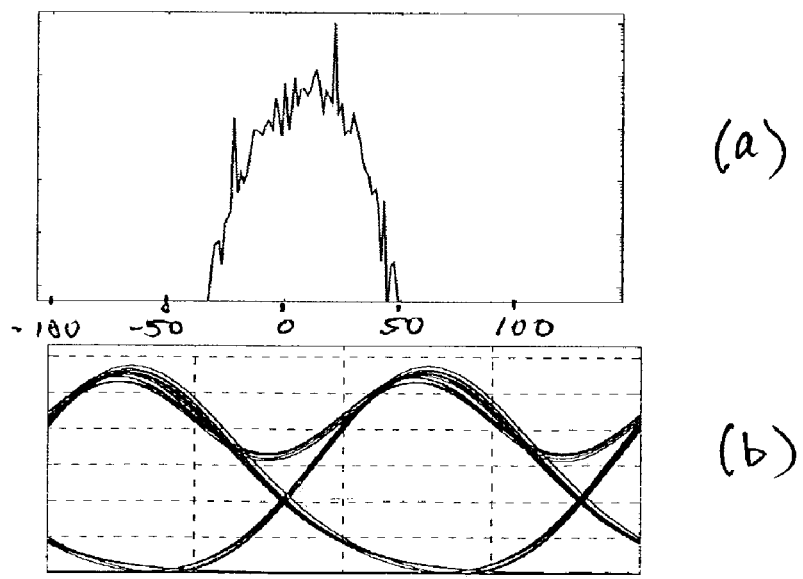
FIGS. 14(a) and 14(b) are plots of signal spectrum and time-domain eye opening, respectively, of a second modulated optical signal resulting from narrowband filtering of an AP-RZ modulated optical signal generated by the transmitter of FIG. 7.
Figure 15:
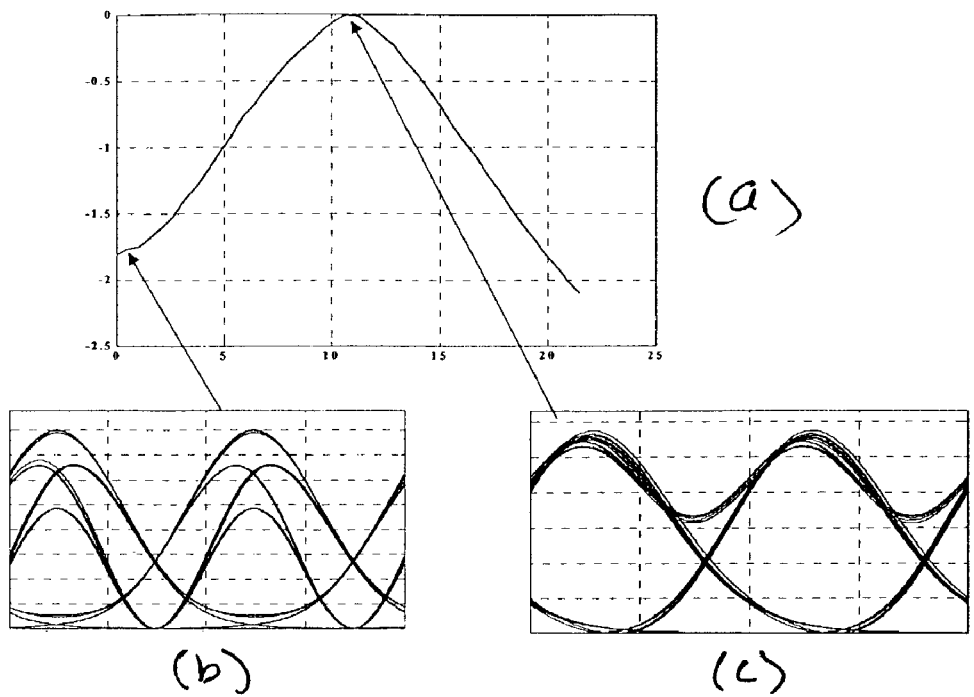
FIGS. 15(a), 15(b) and 15(c) are plots of signal eye opening as a function of filter center frequency offset, a minimum eye opening, and a maximum eye opening for the filtered second modulated optical signal of FIGS. 14(a) and 14(b)
Figure 16:
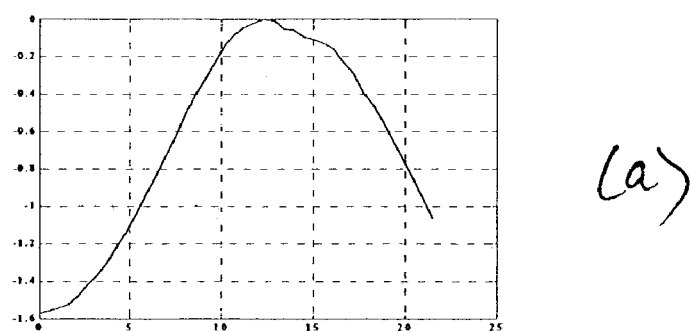
FIGS. 16(a) and 16(b) are plots of signal eye opening as a function of filter center offset for an RZ signal after narrowband filtering with first and second pass-band widths, respectively.
Figure 16:
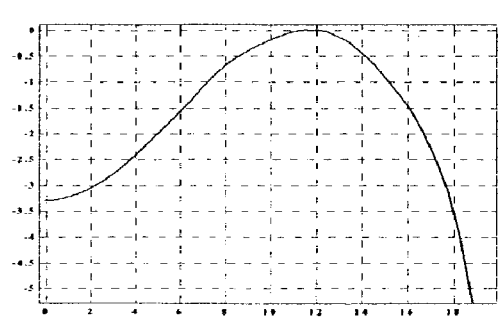
Figure 17:
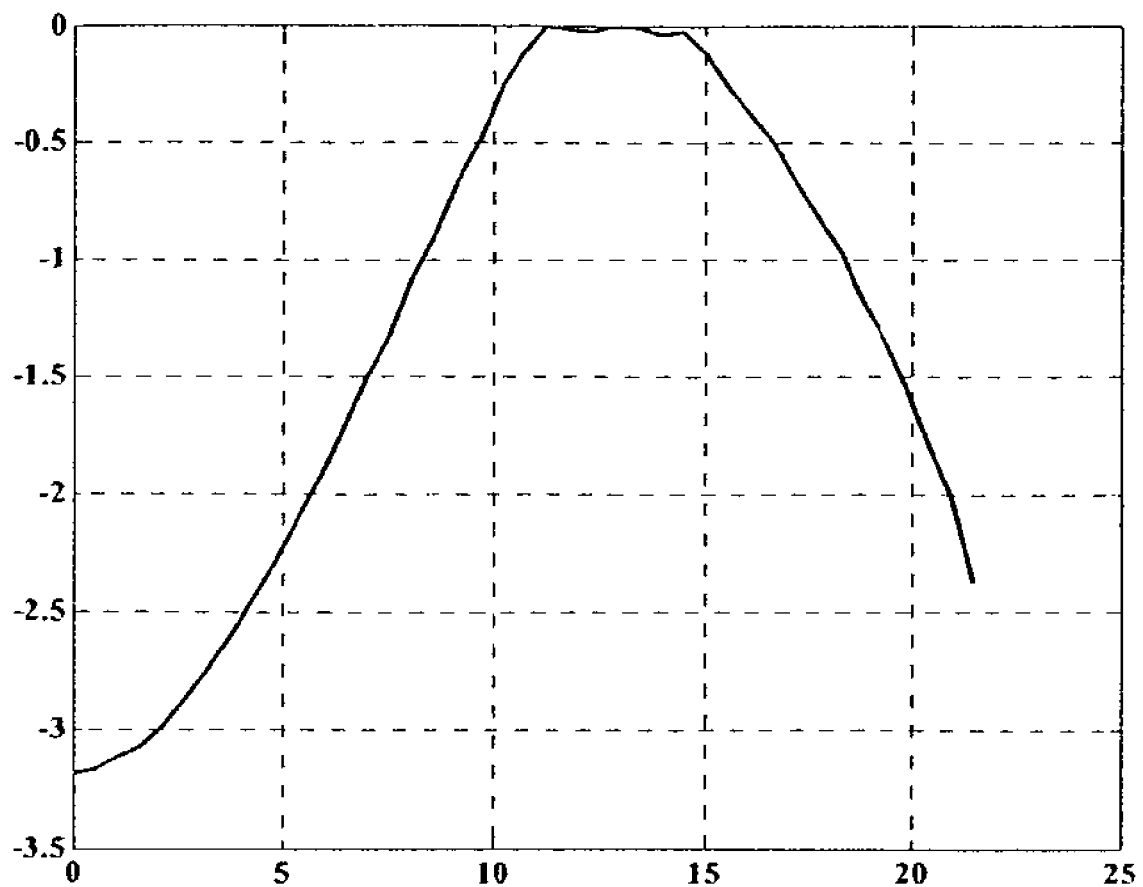
FIG. 17 is a plot of signal eye opening as a function of filter center offset for a narrowband filtered NRZ signal.

Examples of techniques for generating AP-RZ signals are described below. One such technique involves optical filtering of an RZ optical signal in a manner that shifts the frequency spectrum of the optical signal by:

$$\Delta v_{shift} = \pm \frac{1}{2 \cdot (2T)} \pm \frac{1}{4T} \quad (1)$$

i.e. by one quarter of the signal bit-rate. As an example, FIG. 14 shows a 43 Gb/s AP-RZ optical data signal generated by transmitting a 43 Gb/s RZ signal through a narrowband optical filter (3 dB bandwidth of 25 GHz) whose center frequency is offset from the center frequency of the optical signal by 10.75 GHz, or one quarter of the bit rate. The eye diagram of the resultant signal (FIG. 14(b)) is still well open. FIG. 15(a) shows a representative plot of signal eye opening as a function of the offset of the filter center frequency from the center frequency of a non-AP-RZ signal, while FIGS. 15(b) and 15(c) show the minimum eye opening at an offset of 0 and the maximum eye opening at an offset of 1/(4T), respectively. FIGS. 16(a) and 16(b) show the signal eye opening as a function of filter center offset for a 43 Gb/s RZ signal after narrowband filtering with a 25 GHz bandpass and a 20 GHz bandpass filter respectively. FIG. 17 shows the signal eye opening as a function of filter center offset for a 43 Gb/s NRZ signal with a 25 GHz bandpass.

Figure 18:
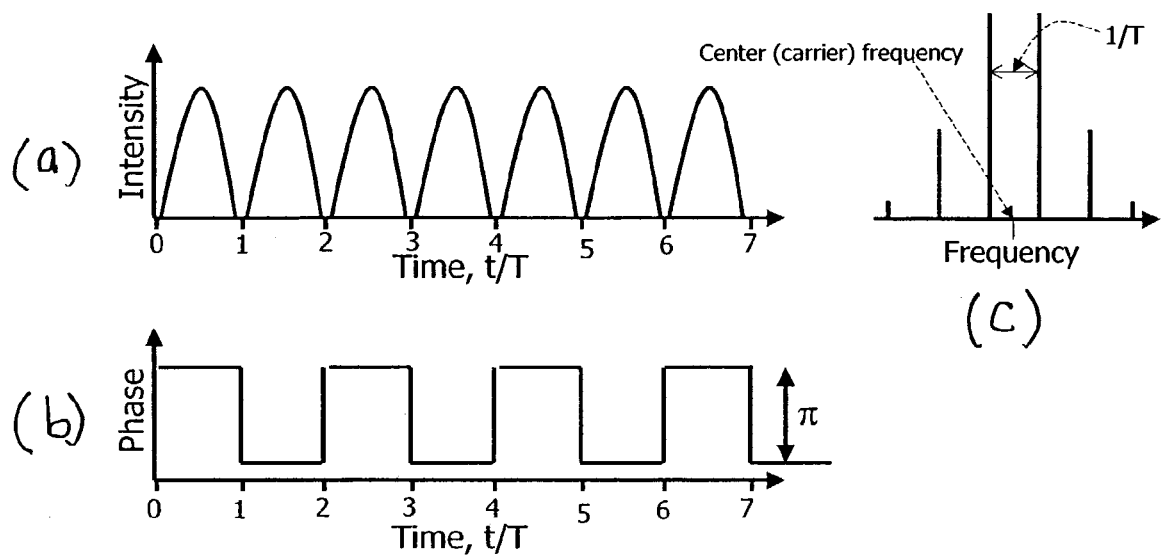
FIGS. 18(a-c) and 19(a-c) are plots of waveforms and spectra appearing in carrier-suppressed and non-carrier-suppressed modulator systems as known in the art.
Figure 19:
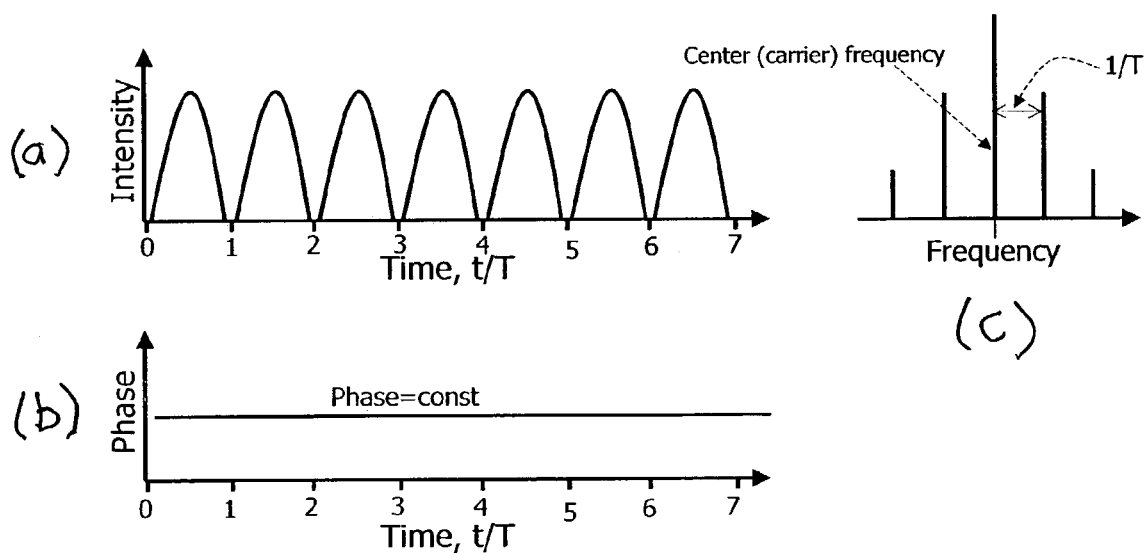

Techniques for Generating Alternating-phase Modulated Signals As described above, adjacent pulses of an AP($\pi$)-RZ signal have a phase difference of $\pi$, and this alternating phase gives, rise to the suppression or expression of the spectral component at the central (carrier) frequency of the modulated optical signal. The power, phase and frequency spectrum of a carrier-suppressed AP-RZ signal are illustrated in FIGS. 18(*a*), 18(*b*), and 18(*c*), respectively. The spectrum of FIG. 18(*c*) can be contrasted with the spectrum of a non-AP-RZ signal as shown in FIG. 19(*c*).

Figure 20:
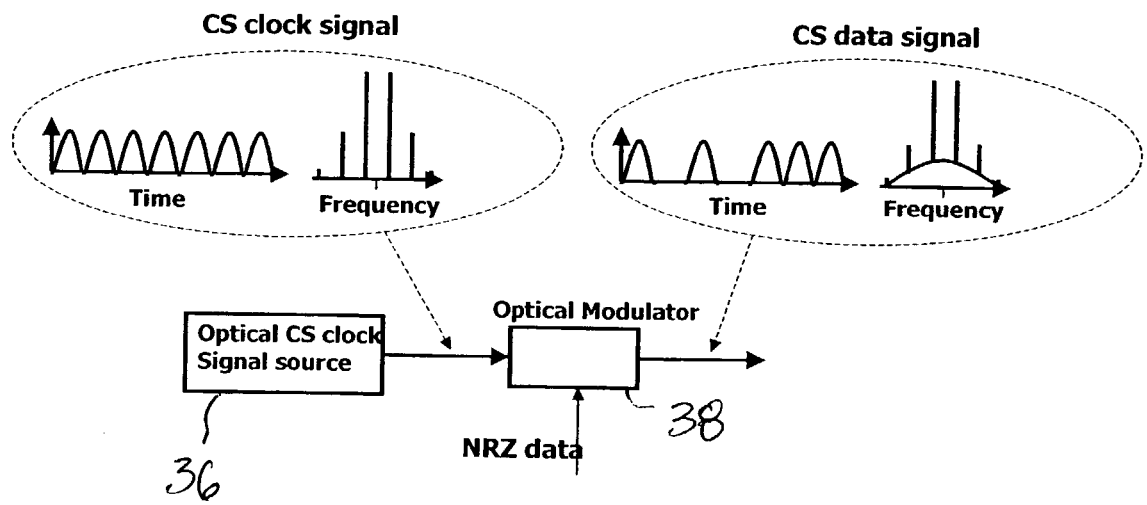
FIG. 20 is a block diagram of a modulator system for generating carrier-suppressed modulation.

FIG. 20 illustrates a technique for generating a CS-RZ data signal, which as described above is the AP($\pi$)-RZ signal, a special case of an AP-RZ signal. An optical CS clock source 36 generates a CS clock signal, which is provided to an optical modulator 38 driven by NRZ data. A number of methods currently exist for generating CS clock optical signals. In one method, the laser source itself generates a stream of CS pulses (i.e., a CS optical clock signal). In another method, outputs from two single-frequency CW lasers with different carrier frequencies are combined. The repetition rate of the CS clock pulses equals the difference of the carrier frequencies of the two lasers. In a third method, two beating frequencies are spectrally selected from a phase-modulated CW laser signal. The most widely used technique, however, employs a CW laser externally modulated by a Mach-Zehnder modulator. The modulator is biased at minimum transmission (to suppress the carrier frequency), and the two arms of the modulator are driven push-pull by a sinusoidal signal at a frequency equal to half the bit-rate of the NRZ data signal.

Below are described three new methods for generating AP-RZ optical signals. The methods are based on the conversion of an RZ optical signal (either an RZ data signal or an RZ clock signal) into an AP-RZ signal. One of the advantages is that the AP-RZ signal can be generated with various kinds of optical modulators (i.e. not necessarily a Mach-Zehnder modulator). Also, the methods permit generating not just AP($\pi$)-RZ signals (for which the optical phase difference between adjacent pulses is $\pi$), but AP-RZ signals having an arbitrary desired optical phase difference between the pulses.

As mentioned above, the methods involve converting an ordinary RZ optical signal into an AP-RZ signal with a desired phase relationship between pulses. Two of the methods are based on shifting the central frequency of an RZ data signal or an RZ clock signal. The complex envelope of the electrical field of the initial RZ signal can be denoted $E_0(t)$, where t is time. In many practical cases, where the RZ signal is formed by external modulation of a CW laser signal, there is a certain (fixed) phase difference $\Delta\Phi_0$ between adjacent pulses:

$$\Delta\Phi_0 = \text{phase}(E_0(t+T)) - \text{phase}(E_0(t)), \quad (2)$$

where 1/T is the repetition rate (or bit-rate) of the signal. Note also that in most practical cases the adjacent pulses have the same phase, i.e. $\Delta\Phi_0=0$.. In order to convert this signal into an AP-RZ signal having a desired phase difference $\Delta\Phi_{desired}$ between adjacent pulses, the phase difference $\Delta\Phi_0$ must be changed to $\Delta\Phi_{desired}$. This can be done by shifting the central frequency of the signal by $\Delta v_{shift} = \Delta\omega_{shift}/2\pi$. The amount of frequency shift required can be calculated in the following manner.

Mathematically, shifting the central angular frequency of the signal by $\Delta\omega_{shift}$ means conversion of $E_0(t)$ to $$E(t) = E_0(t)\exp(i\Delta\omega_{shift}t) \quad (3)$$

This means that the optical phase difference between adjacent pulses is now:

$$\Delta\Phi = \text{phase}(E(t+T)) - \text{phase}(E(t)) = \Delta\Phi_0 + \Delta\omega_{shift}T. \quad (4)$$

If the desired phase difference is $\Delta\Phi_{desired}$, then the necessary $\Delta\omega_{shift}$ is:

$$\Delta\omega_{shift} = (\Delta\Phi_{desired} - \Delta\Phi_0)/T \quad (5)$$

In particular, when $\Delta\Phi_0=0$ and the desired resultant signal is an AP($\pi$)-RZ signal (i.e. when $\Delta\Phi_{desired}=\pm\pi+2\pi m$, where m=0,±1,±2. . . ), $$\Delta v_{shift} = \pm\frac{1}{2T} + \frac{m}{T} \quad (6)$$

This means that an ordinary RZ signal where all the pulses have the same phase can be converted into an AP($\pi$)-RZ signal by shifting the central optical frequency of the signal by half the repetition rate (half the bit-rate) of the signal. Two ways of accomplishing this frequency shift are shown below: 1) by applying sawtooth phase modulation at the bit-rate frequency of the signal, and 2) By applying spectral filtering to the signal.

Figure 21:
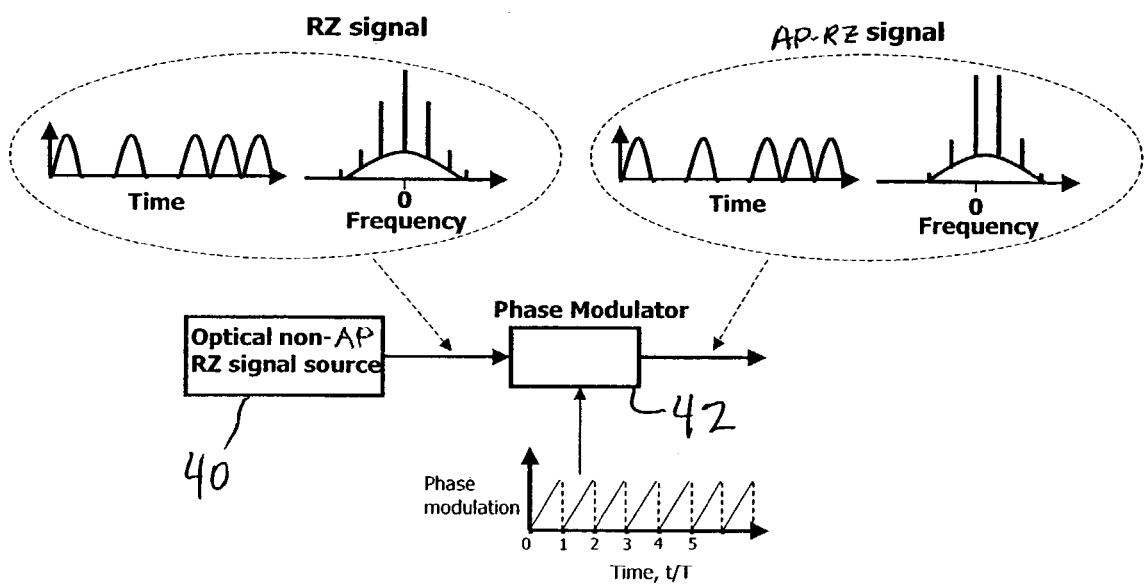
FIG. 21 is a block diagram of a modulator system for generating an alternating-phase (AP) RZ modulated optical signal using sawtooth modulation in accordance with another aspect of the present invention.
Figure 22:
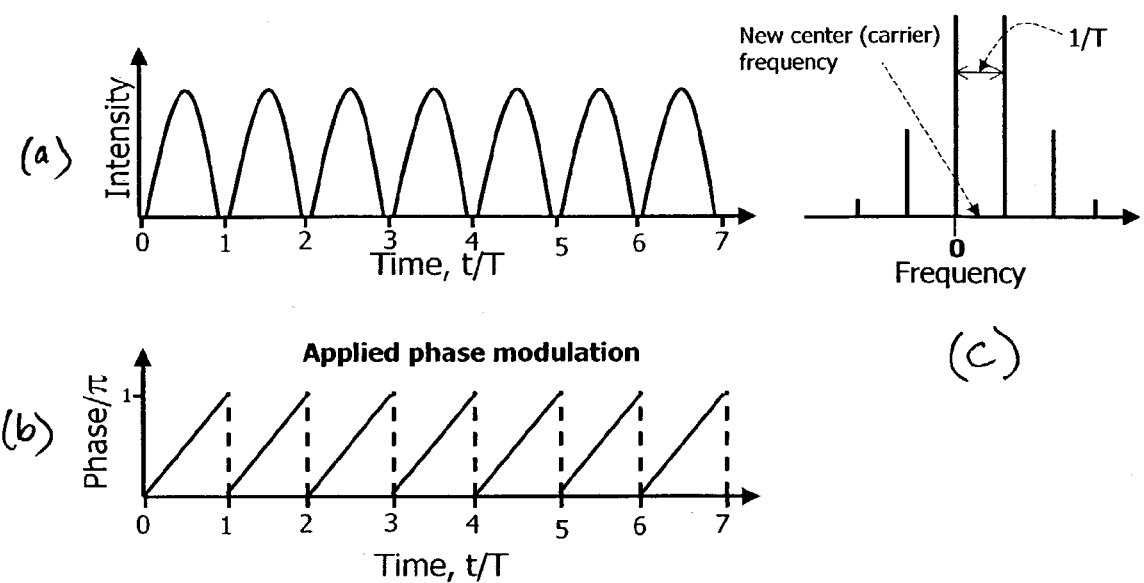
FIGS. 22(a), 22(b), and 22(c) are plots of intensity, phase, and optical spectrum in the modulator system of FIG. 21.

FIG. 21 illustrates the technique of applying sawtooth phase modulation to an optical RZ signal to generate an AP-RZ signal. A source 40 of an ordinary RZ signal (either a data signal or a clock signal) is followed by a phase modulator 42 that applies the sawtooth phase modulation to the non-AP signal at the bit-rate frequency. The AP-RZ signal with a desired phase difference $\Delta\Phi_{desired}$ between adjacent pulses is obtained if a periodic phase modulation $\phi(t)$ with a saw-tooth waveform having a constant phase derivative $\partial\phi/\partial t$ within each bit time slot T is used (see FIGS. 21-22). This phase derivative corresponds to the angular frequency shift stated in equation (5) above:

$$\Delta\omega_{shift} = \partial\phi/\partial t = (\Delta\Phi_{desired} - \Delta\Phi_0)/T \quad (7)$$

For example, when $\Delta\Phi_0=0$ and the desired resultant signal is an AP($\pi$)-RZ signal (i.e. when $\Delta\Phi_{desired}=\pm\pi$), the required slope of the phase modulation is:

$$\frac{\partial\phi}{\partial t} = \pm\frac{\pi}{T} \quad (8)$$

The result of such a phase modulation is an AP-RZ signal. It is important to note that such a periodic phase modulation results also in a shift of the center (carrier) frequency of the signal. In the case of phase modulation in accordance with equation (8), the frequency shift is half the bit-rate of the signal:

$$\Delta v_{shift} = \frac{1}{2\pi}\frac{\partial\phi}{\partial t} = \pm\frac{1}{2T}$$

For practical use, the saw-tooth waveform can be approximated by a sinusoidal phase modulation:

$$\phi(t) = \Theta\sin\left(\frac{2\pi}{T}t\right) \quad (9)$$

In this case, it is desirable that the pulses of the RZ signal coincide in time with the position of maximum derivative of the phase modulation $\phi(t)$, i.e. with t=0,±T,±2T, . . . , ±nT, . . . or t=0.5T,0.5T±T,0.5T±2T, . . . . 0.5T±nT, . . . . The required amplitude $\Theta$ of the sinusoidal phase modulation can be estimated from equations (7)-(9). For example, when $\Delta\Phi_0=0$ and the desired resultant signal is an AP($\pi$)-RZ signal (i.e. when $\Delta\Phi_{desired}=\pm\pi$), the required amplitude $\Theta$ of the sinusoidal phase modulation is:

$$\Theta \cong 0.5\pi \quad (10)$$

Note that the optimum value of $\Theta$ will depend slightly on the pulse width of the RZ signal.

Figure 23:
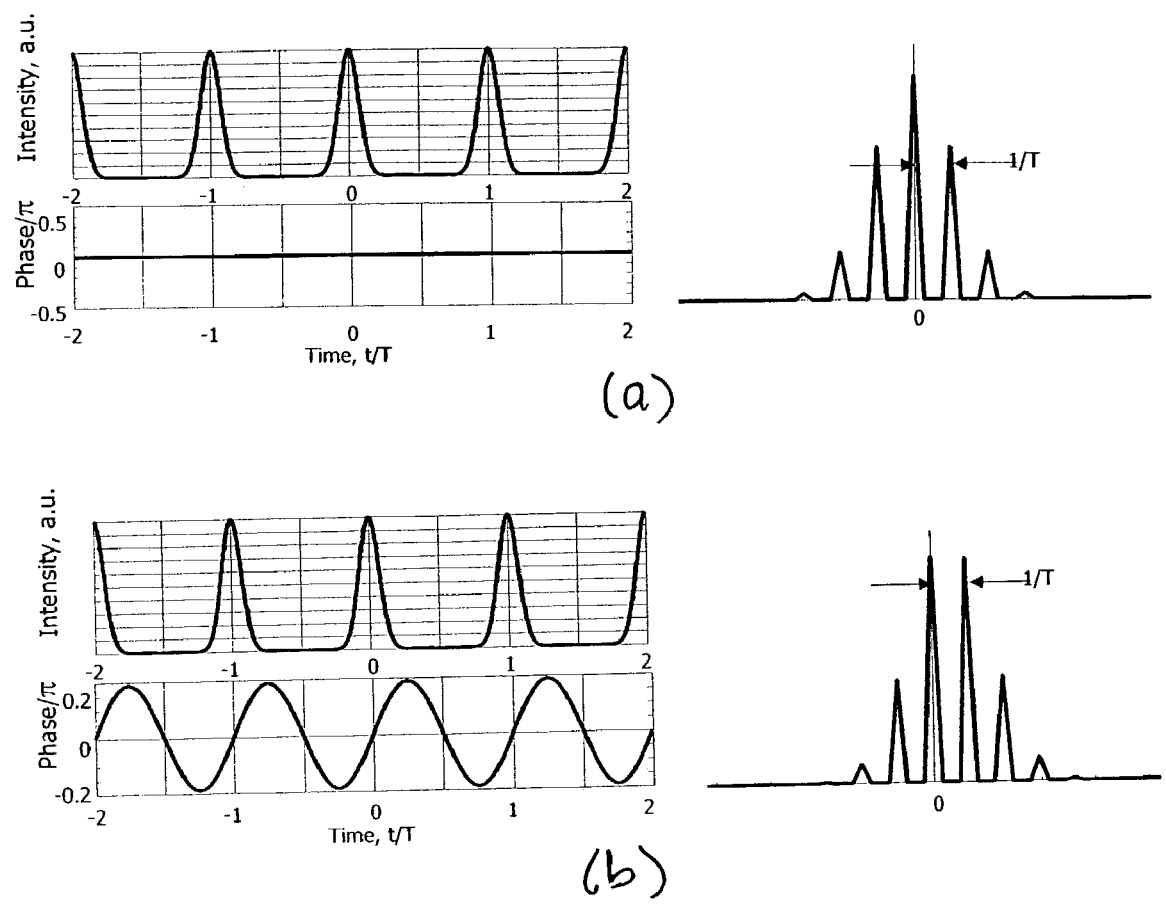
FIGS. 23(a) and 23(b) are plots of various waveforms and spectra resulting from simulations of a modulator system such as the modulator system of FIG. 21.

The results of numerical simulations for the case of sinusoidal modulation at the bit rate frequency are shown in FIG. 23. FIG. 23(a) shows an initial non-CS pulse train together with its spectrum and phase. FIG. 23(b) shows the result of applying a sinusoidal phase modulation (eq. 9) with $\Theta=0.5\pi$. The spectrum center becomes shifted by $1/(2T)$, and the signal becomes carrier-suppressed.

It is noted that intensity modulators such as electro-absorption modulators, which are often used for generation of the non-CS clock signals by carving the pulses from CW light, can introduce a phase modulation in addition to the amplitude modulation. By adjusting the parameters of the phase modulation in the manner described above, an AP-RZ signal can be generated directly at the output of the data modulator, avoiding the need for a separate phase modulator.

Figure 24:
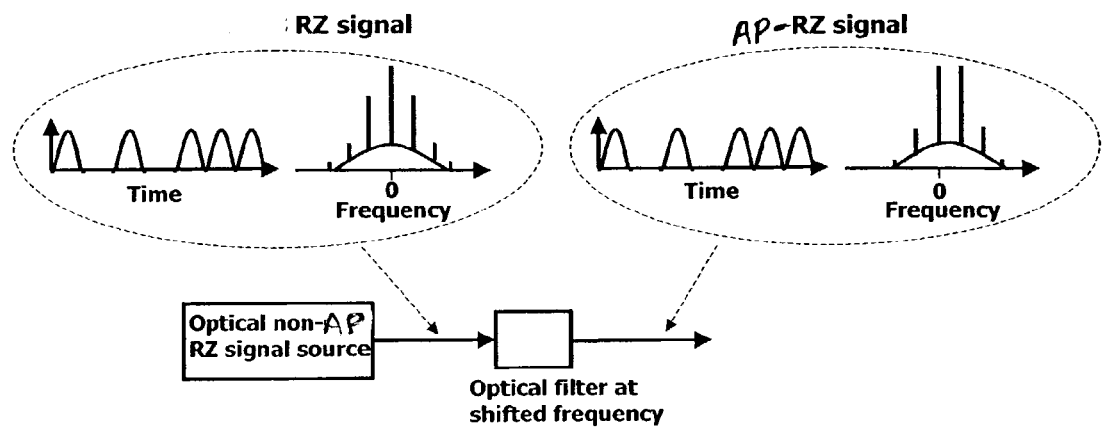
FIG. 24 is a block diagram of a modulator system for generating an alternating-phase (AP) RZ modulated optical signal using optical filtering in accordance with another aspect of the present invention.
Figure 25:
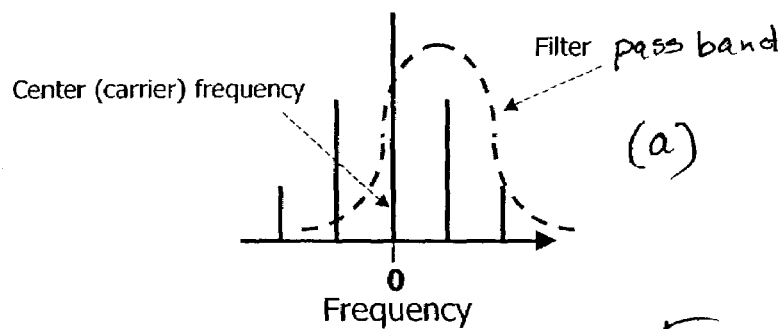
FIGS. 25(a) and 25(b) are plots of signal spectra in the modulator system of FIG. 24.
Figure 25:
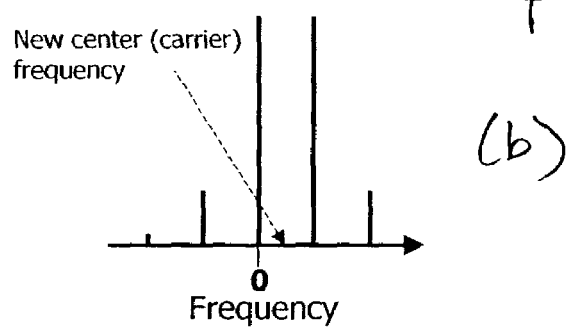

As mentioned above, an AP($\pi$)-RZ signal (or other signal with any desired phase difference between pulses) can also be generated by shifting the optical center (carrier) frequency of an ordinary RZ signal using spectral filtering. Such a technique is illustrated in FIGS. 24-25. As shown in FIG. 25(a), the filter pass band should only partially overlap with the central part of the optical spectrum of the signal—the center frequency of the filter should be shifted with respect to the center frequency of the initial non-AP-RZ signal. As a result, the signal after optical filtering will be shifted in frequency. This is shown in FIG. 25(b).

Figure 27:
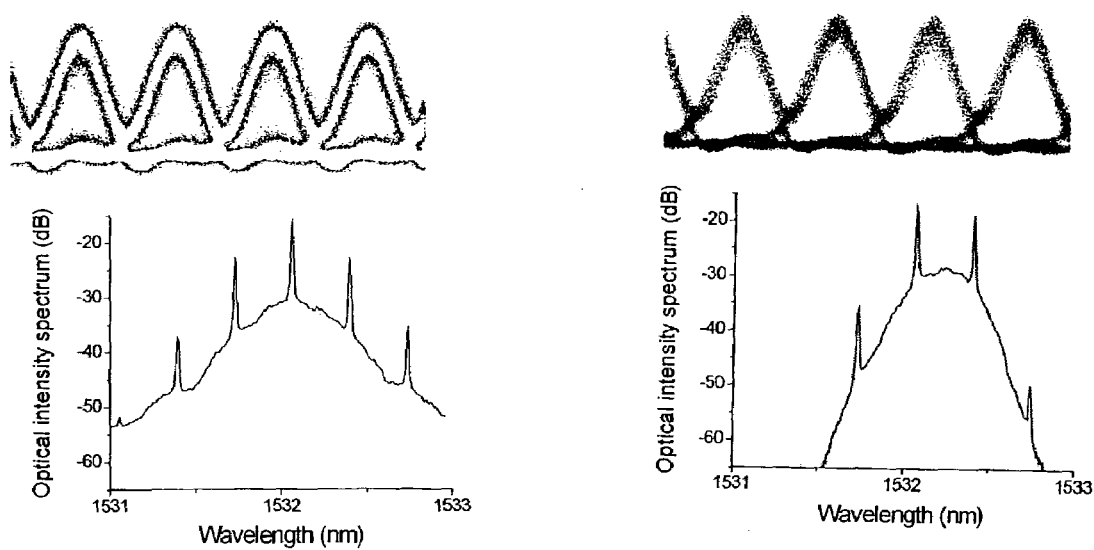
FIGS. 26 and 27 are plots of various waveforms and spectra in a modulator system such as the modulator system of FIG. 24.
Figure 26:
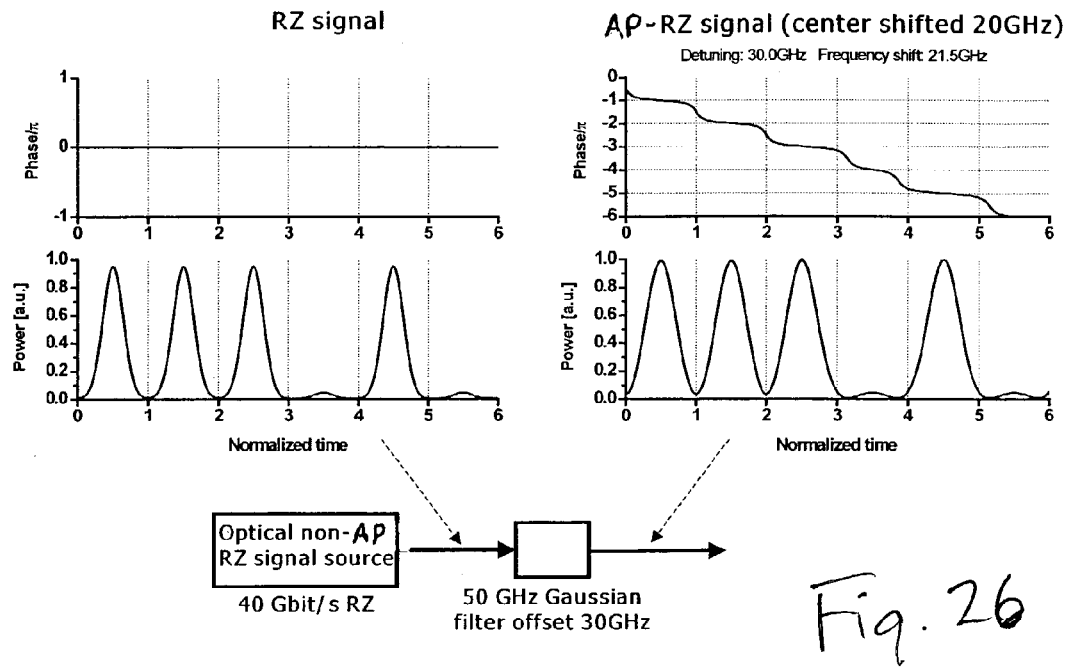

By adjusting the offset of the filter pass band center with respect to the signal spectrum center, the frequency shift $\Delta v_{shift}$ of the output signal with respect to the input signal can be changed, and the desired phase difference between pulses can be obtained. This is illustrated in FIG. 26, which shows an RZ signal before and after filtering with a properly offset Gaussian optical filter. The generation of an AP($\pi$)-RZ signal by filtering a non-AP-RZ signal has also been demonstrated experimentally. FIG. 27(a) shows the eye diagram and spectrum of a non-AP-RZ signal generated in two cascaded external modulators. By applying suitable optical filtering to the signal, it is converted into an AP($\pi$)-RZ signal with the eye diagram and spectrum shown in FIG. 27(b).

Figure 28:
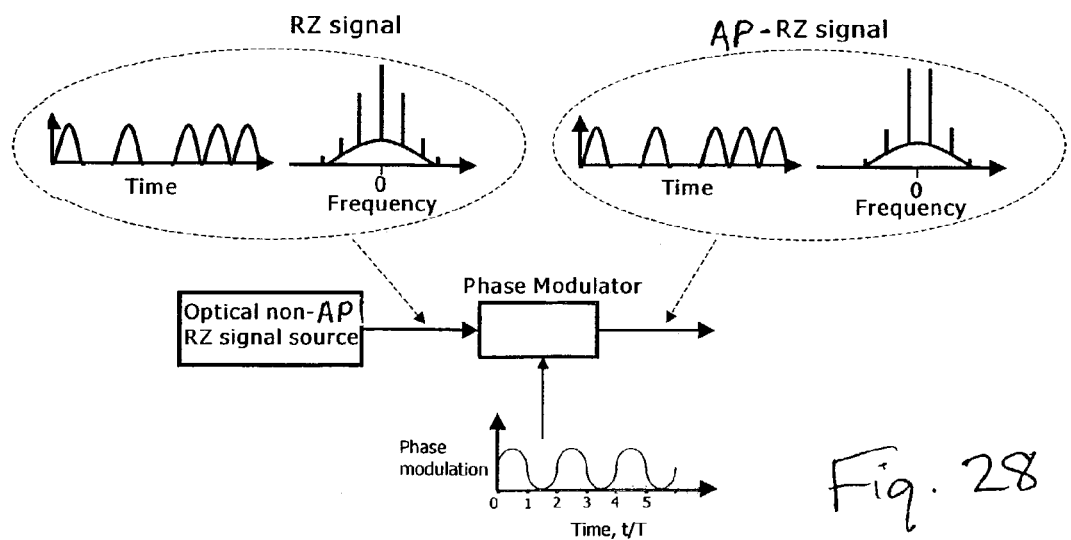
FIG. 28 is a block diagram of a modulator system for generating an alternating-phase (AP) RZ modulated optical signal using periodic phase modulation at half the signaling rate of the modulating data signal in accordance with another aspect of the present invention.
Figure 29:
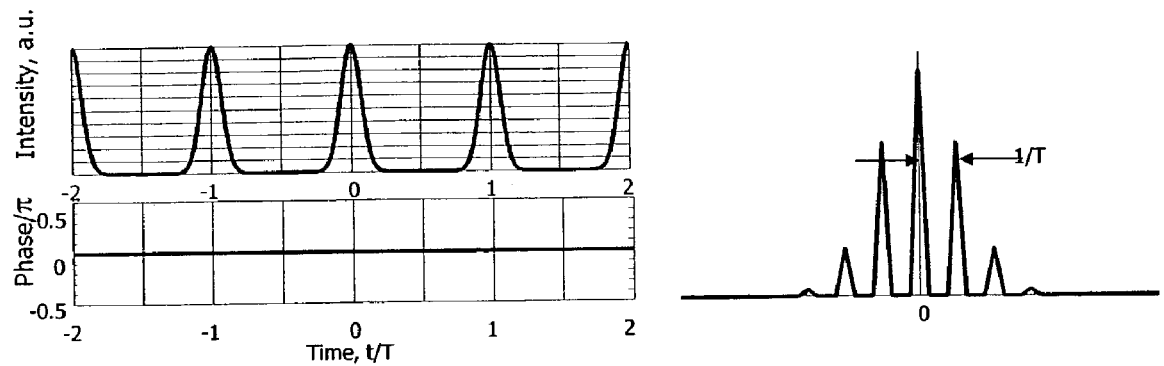
FIGS. 29(a) and 29(b) are plots of various waveforms and spectra in the modulator system of FIG. 28.
Figure 29:
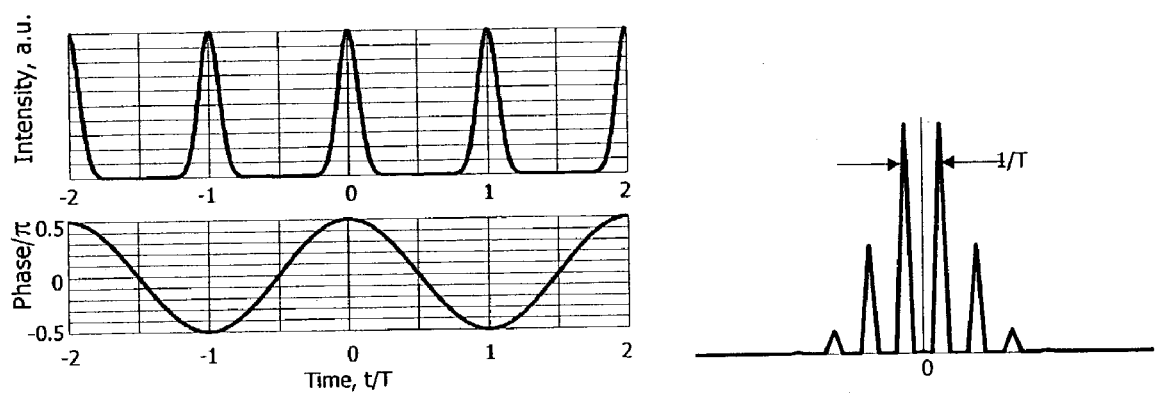

It is also possible to generate AP($\pi$)-RZ signals (or signals with any desired phase difference between adjacent pulses) without shifting the carrier or center frequency. This is accomplished by applying a phase modulation at half the bit rate frequency to non-AP-RZ signals. The phase modulation preferably has a square shape, and the amplitude of the phase modulation (peak-to-peak swing) is set equal to the desired phase difference $\Delta\Phi_{desired}$ (see FIG. 18). However, it is also possible to use other waveforms. For example, FIGS. 28 and 29 illustrate the use of a sinusoidal phase modulation at half the bit frequency:

$$\phi(t) = \Theta\cos\left(\frac{\pi}{T}t\right) \quad (11)$$

The required amplitude of the phase modulation can be estimated from $$\Theta \cong 0.5\Delta\Phi_{desired} \quad (12)$$

For example, when $\Delta\Phi_0=0$ and the desired resultant signal is an AP($\pi$)-RZ signal (i.e. when $\Delta\Phi_{desired}=\pm\pi$), the required amplitude $\Theta$ of the sinusoidal phase modulation is:

$$\Theta \cong 0.5\pi \quad (13)$$

The results of numerical simulations for the case of sinusoidal modulation at half of the bit rate frequency are shown in FIG. 29. FIG. 29(a) shows an initial non-CS pulse train together with its spectrum and phase. FIG. 29(b) shows the result of applying a sinusoidal phase modulation (eq. 11) with $\Theta=0.5\pi$. The spectrum center remains un-shifted, but the signal becomes carrier-suppressed.

It will be apparent to those skilled in the art that modifications to and variations of the disclosed methods and apparatus are possible without departing from the inventive concepts disclosed herein, and therefore the invention should not be viewed as limited except to the full scope and spirit of the appended claims.

What is claimed is:

1. A method of generating a phase-shaped binary modulated optical signal, comprising:
    generating first and second binary phase-modulated optical signals from a carrier optical signal and a binary data signal, the binary data signal having a specified bit periodr;
    delaying modulation of the first binary phase-modulated optical signal by an integral number of bit periods of the binary data signal with respect to modulation of the second binary phase-modulated optical signal; and
    optically combining the first and second binary phase-modulated optical signals to create the phase-shaped binary modulated optical signal.

2. The method according to claim 1,
    wherein generating the first and second binary phase-modulated optical signals comprises (i) phase modulating the optical carrier signal with the binary data signal to generate a phase-modulated optical signal, and (ii) in an optical interferometer, splitting the phase-modulated optical signal into two components of substantially equal power and optically delaying one of the components of the phase-modulated optical signal by an integral number of bit periods of the binary data signal, and
    wherein optically combining the first and second binary phase-modulated optical signals comprises, in the optical interferometer, providing the first and second binary phase-modulated optical signals to two inputs of an optical combiner.

3. The method according to claim 2, wherein the phase-shaped binary modulated optical signal has an associated center optical frequency, and further comprising biasing the optical interferometer at maximum continuous-wave transmission such that the phase-shaped binary modulated optical signal has maximum power around the center optical frequency.

4. The method according to claim 2, wherein the phase-shaped binary modulated optical signal has an associated center optical frequency, and further comprising biasing the optical interferometer at minimum continuous-wave transmission such that the phase-shaped binary modulated optical signal has mirdmum power around the center optical frequency.

* * * * *

UNITED STATES PATENT AND TRADEMARK OFFICE
CERTIFICATE OF CORRECTION

| | |
|---|---|
| PATENT NO. | : 7,366,425 B2 |
| APPLICATION NO. | : 10/386359 |
| DATED | : April 29, 2008 |
| INVENTOR(S) | : Pavel V. Mamyshev et al. |

It is certified that error appears in the above-identified patent and that said Letters Patent is hereby corrected as shown below:

Column 6, line 62, "Signals As" should read --Signals.  As--;

Column 10, claim 1, line 27, "periodr;" should read --period;-- and

Column 10, claim 4, line 64, "mirdmum" should read --minimum--.

Signed and Sealed this

Ninth Day of December, 2008

JON W. DUDAS
*Director of the United States Patent and Trademark Office*